(12) United States Patent
Flynn (10) Patent No.: US 10,661,376 B2
(45) Date of Patent: May 26, 2020

(54) PORTABLE PLASMA TUBE CUTTING APPARATUS FOR COPING AND CUTTING

(71) Applicants: Versafab Corp., Gardena, CA (US); FOX Service Company, Gardena, CA (US)

(72) Inventor: Joseph J. Flynn, Gardena, CA (US)

(73) Assignees: Versafab Corp., Gardena, CA (US); FOX Service Company, Gardena, CA (US)

(*) Notice: Subject to any disclaimer, the term of this patent is extended or adjusted under 35 U.S.C. 154(b) by 320 days.

(21) Appl. No.: 15/867,499

(22) Filed: Jan. 10, 2018

(65) Prior Publication Data

US 2018/0193941 A1 Jul. 12, 2018

Related U.S. Application Data

(60) Provisional application No. 62/444,732, filed on Jan. 10, 2017.

(51) Int. Cl.
*B23K 10/00* (2006.01)
*B23D 21/00* (2006.01)
*B23K 37/02* (2006.01)

(52) U.S. Cl.
CPC ............ *B23K 10/006* (2013.01); *B23D 21/00* (2013.01); *B23K 10/00* (2013.01); *B23K 37/027* (2013.01)

(58) Field of Classification Search
CPC .................................................. B23D 21/00
USPC ................ 219/121.39, 121.11–121.86
See application file for complete search history.

(56) References Cited

U.S. PATENT DOCUMENTS

| 8,783,140 B2* | 7/2014 | Dick | B23D 45/14 83/13 |
| 9,860,965 B2* | 1/2018 | Recker | H05B 37/0272 |
| 9,996,072 B2* | 6/2018 | Dick | B23D 45/14 |
| 2011/0056344 A1* | 3/2011 | Dick | B23D 45/14 83/13 |
| 2013/0211576 A1* | 8/2013 | Dick | B23D 45/14 700/180 |
| 2014/0163664 A1* | 6/2014 | Goldsmith | A61B 17/00491 623/1.11 |
| 2015/0073579 A1* | 3/2015 | Dick | B23D 45/14 700/114 |
| 2016/0051806 A1* | 2/2016 | Goldsmith | A61N 1/00 604/21 |
| 2017/0223807 A1* | 8/2017 | Recker | H05B 37/0281 |
| 2019/0125361 A1* | 5/2019 | Shelton, IV | A61B 17/0206 |

(Continued)

*Primary Examiner* — Lori L Baker (57) ABSTRACT

A portable plasma cutting apparatus for coping and cutting pre-bend tubular members includes a control unit, a control arm, a first step motor, a second step motor, a linear drive mechanism, a rotary drive mechanism, a plasma cutter, a tube placement deck, and a platform. The control arm is operatively coupled with the first step motor by the rotary drive mechanism to rotationally drive the control arm around a rotational axis. The control arm is operatively coupled with the second step motor by the linear drive mechanism to linearly drive the control arm along the rotational axis. A torch of the plasma cutter is terminally mounted to the control arm and positioned in between the control unit and the tube placement deck as the control arm rotationally and linearly moves about the control unit. The platform provides the sufficient height for the portable plasma cutting apparatus.

7 Claims, 11 Drawing Sheets

(56) References Cited

U.S. PATENT DOCUMENTS

| | | | |
|---|---|---|---|
| 2019/0125454 A1* | 5/2019 | Stokes | A61B 34/10 |
| 2019/0125455 A1* | 5/2019 | Shelton, IV | A61B 17/07207 |
| 2019/0125456 A1* | 5/2019 | Shelton, IV | A61B 34/10 |
| 2019/0125457 A1* | 5/2019 | Parihar | A61B 34/10 |
| 2019/0125458 A1* | 5/2019 | Shelton, IV | A61B 34/10 |
| 2019/0125459 A1* | 5/2019 | Shelton, IV | A61B 34/25 |
| 2019/0200844 A1* | 7/2019 | Shelton, IV | A61B 1/00045 |
| 2019/0200977 A1* | 7/2019 | Shelton, IV | A61B 17/07207 |
| 2019/0201104 A1* | 7/2019 | Shelton, IV | A61B 1/00009 |
| 2019/0201105 A1* | 7/2019 | Shelton, IV | A61B 17/0206 |
| 2019/0201136 A1* | 7/2019 | Shelton, IV | A61B 90/98 |
| 2019/0205001 A1* | 7/2019 | Messerly | G01S 17/89 |
| 2019/0206562 A1* | 7/2019 | Shelton, IV | A61B 34/71 |
| 2019/0206565 A1* | 7/2019 | Shelton, IV | A61B 17/0682 |
| 2019/0247050 A1* | 8/2019 | Goldsmith | A61B 17/12181 |
| 2019/0374213 A1* | 12/2019 | Goldsmith | A61B 10/02 |

\* cited by examiner

PORTABLE PLASMA TUBE CUTTING APPARATUS FOR COPING AND CUTTING

The current application claims a priority to the U.S. Provisional Patent application Ser. No. 62/444,732 filed on Jan. 10, 2017.

FIELD OF THE INVENTION

The present invention relates generally to an apparatus for metalworking. More specifically, the present invention is a portable tube cutting apparatus for coping and cutting compound angles and straight angles thus allowing metal fabricators, welders, pipe fitters, and maintenance personnel to quickly cut and assemble pre-bent tubular members for welding.

BACKGROUND OF THE INVENTION

Plasma cutting is a process that cuts through electrically conductive materials by mean of accelerated state of matter in which ionized gaseous substance to the point that long-range electric and magnetic fields dominates the behavior of the matter. Steel, stainless steel, aluminum, brass, copper, and other conductive metals can be cut through plasma cutting. Due to the high speed and precision cuts combined with low cost, plasma cutting is utilized from large-scale industrial CNC applications down to small hobbyist shop applications, such as fabrication shops, automotive repairs, industrial construction, and salvage/scrapping operations. Plasma cutting is also introduced to tube cutting process so that pipes and any form of long sections can be cut precisely through a plasma tube cutting apparatus. More specifically, a plasma head of the plasma tube cutting apparatus usually remains stationary while the workpiece is fed through, and rotated around its longitudinal axis to create a uniform cut as long as the workpiece is a straight tube. As a result of the stationary position plasma head and the pipe feeding mechanism of the exciting plasma tube cutting apparatus, any pipes that are pre-bent cannot be cut or cope. Furthermore, these exciting plasma tube cutting apparatus do not function as portable apparatus due to the complexity of the component arrangement.

It is therefore an objective of the present invention to provide a portable plasma tube cutting apparatus for coping and cutting compound angles or straight angles. More specifically, the present invention quickly and cleanly provides a precision cut for pre-bent tubular members that can mate uniformly as a precise scallop cope fit to other tubular members to create precise and stronger welding joints. As a result, the present invention increases manufacturing efficiency capable of cutting straight angles from 5° to 90° as well as compound angles within the same parameters.

DETAIL DESCRIPTIONS OF THE INVENTION

All illustrations of the drawings are for the purpose of describing selected versions of the present invention and are not intended to limit the scope of the present invention.

The present invention is a portable tube cutting apparatus for coping and cutting as the cutting angles can be straight angles or compound angles. More specifically, the present invention quickly and cleanly provides a precision cut for pre-bent tubular members as they can uniformly mate as a precise scallop cope fit to other tubular members thus creating precise and stronger welding joints. The plasma cutting head of the present invention rotates around the workpiece that is placed adjacent to the plasma cutting head thus enabling the coping and cutting of an angle.

Figure 1:
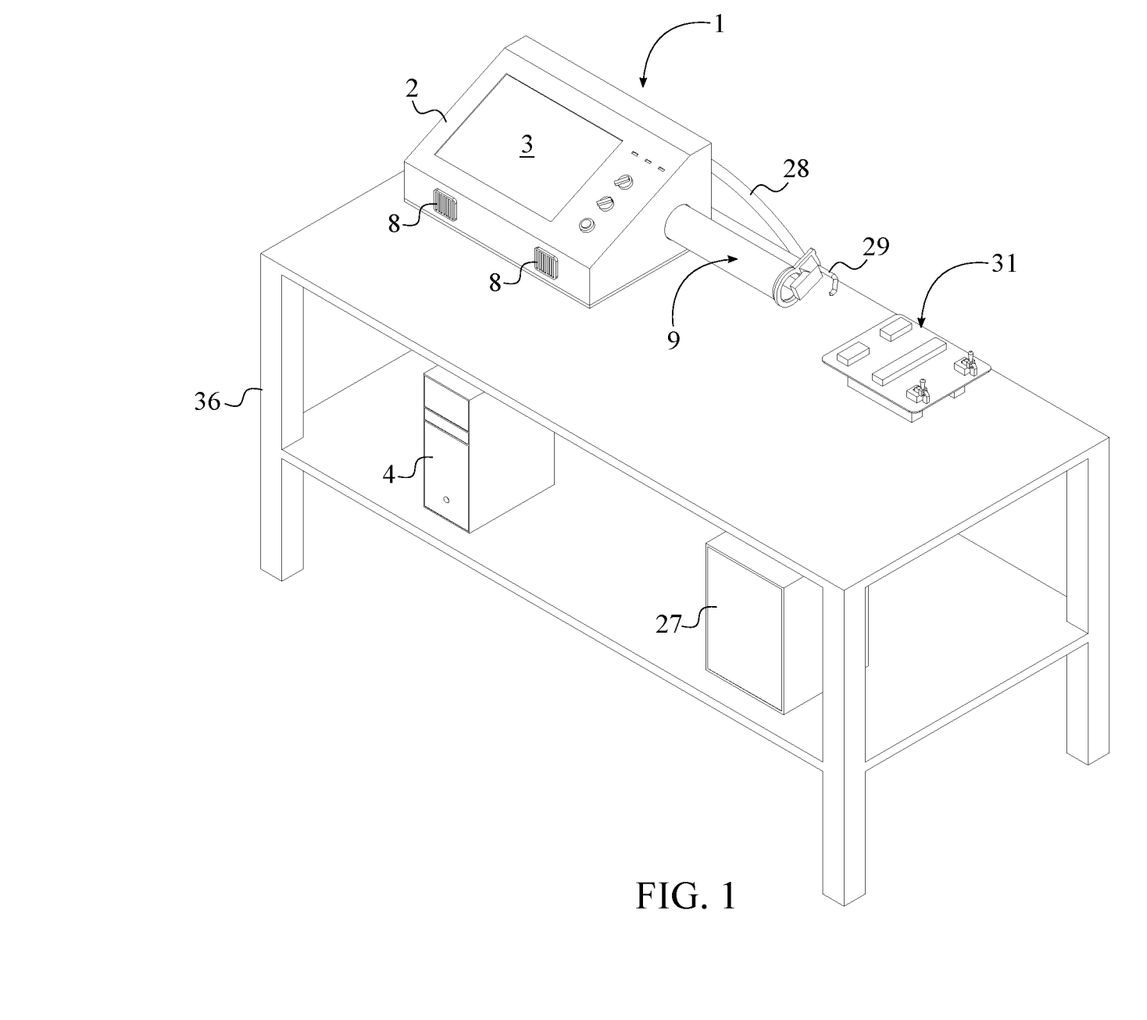
FIG. 1 is a perspective view of the present invention.
Figure 2:
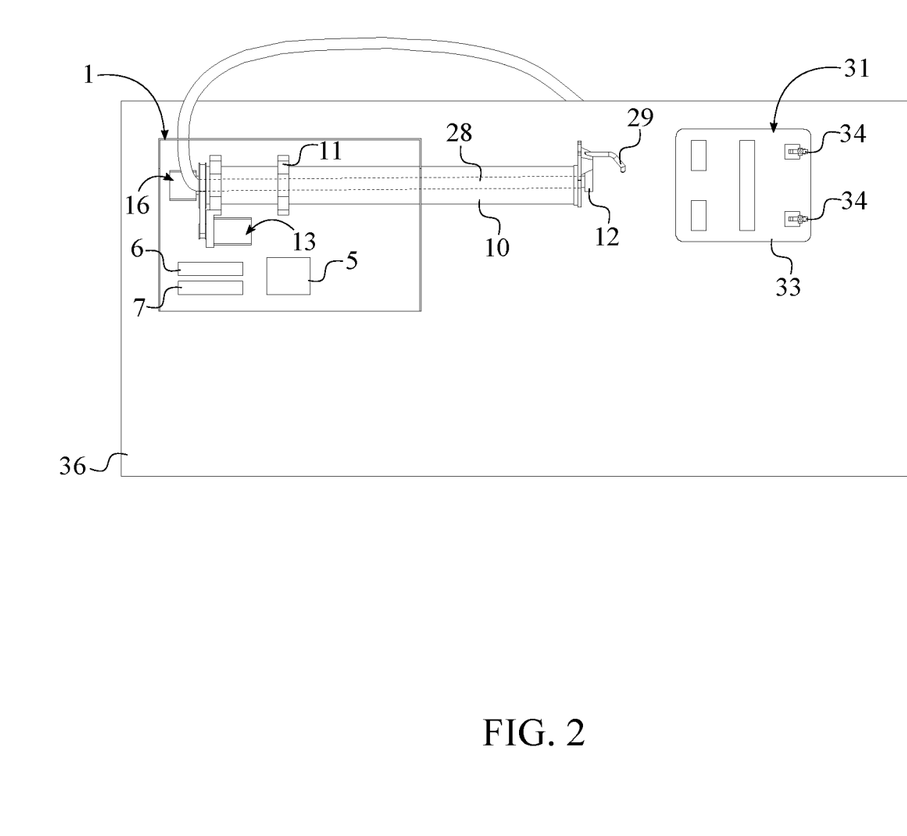
FIG. 2 is a top view of the present invention, showing the inner mounted components of the control unit.

In reference to FIG. 1-2, the present invention comprises a control unit 1, a control arm 9, a first step motor 13, a second step motor 16, a linear drive mechanism 19, a rotary drive mechanism 22, a plasma cutter 26, a tube placement deck 31, and a platform 36. The control unit 1 implements an open loop and/or a close loop communication system so that the first step motor 13 and the second step motor 16 can be operated within the present invention. More specifically, an enclosure 2 of the control unit 1 is adjacently mounted onto the platform 36 that functions as a raised stand. The first step motor 13, the second step motor 16, the linear drive mechanism 19, and the rotary drive mechanism 22 are mounted within the enclosure 2 to protect those components from outside element and to operate the control arm 9 according to input commands of the present invention. The control arm 9 is operatively coupled with the first step motor 13 by the rotary drive mechanism 22, wherein the first step motor 13 is used to rotationally drive the control arm 9 about a rotational axis 35. Additionally, the control arm 9 is operatively coupled with the second step motor 16 by the linear drive mechanism 19, wherein the second step motor 16 is used to linearly drive the control arm 9 along the rotational axis 35. The tube placement deck 31 that secures the workpiece to the present invention is adjacently mounted onto the platform 36 so that the workpiece can be positioned adjacent to the control arm 9. A torch 29 of the plasma cutter 26 is terminally mounted to the control arm 9, in between the enclosure 2 and the tube placement deck 31 thus enabling the torch 29 to be controlled through the linear drive mechanism 19 and the rotary drive mechanism 22 via the control arm 9.

The control unit 1 implements the communication loop within the present invention. More specifically, the control unit 1 implements input commands that is entered into a control panel 3 of the control unit 1 into the first step motor 13, the second step motor 16, and the torch 29. In reference to FIG. 1-2, the control unit 1 further comprises the control panel 3, a computing device 4, a power supply unit 5, a first servo drive 6, a second servo drive 7, and a cooling unit 8. The control panel 3 provide ability to view and change system settings of the present invention. For example, the control panel 3 is used as an interface for adding or removing hardware and software, controlling system settings, operating the computing device 4, operating the first servo drive 6, and operating the second servo drive 7. The control panel 3 is laterally connected to the enclosure 2 and oriented towards an operator of the present invention. As a result, the control panel 3 can be easily accessed by the operator during usage of the present invention. The power supply unit 5, the first servo drive 6, and the second servo drive 7 are mounted within the enclosure 2 thus protecting these components from outside elements. The cooling unit 8 is laterally mounted to the enclosure 2 and removes heat energy generated by the power supply unit 5, the first servo drive 6, and the second servo drive 7. More specifically, before the power supply unit 5, the first servo drive 6, or the second servo drive 7 reaches an elevated operating temperature that can harm integrity of the corresponding component, the cooling unit 8 is automatically activated to withdraw the generated heat energy thus preventing automatic shut of the present invention.

Figure 12:
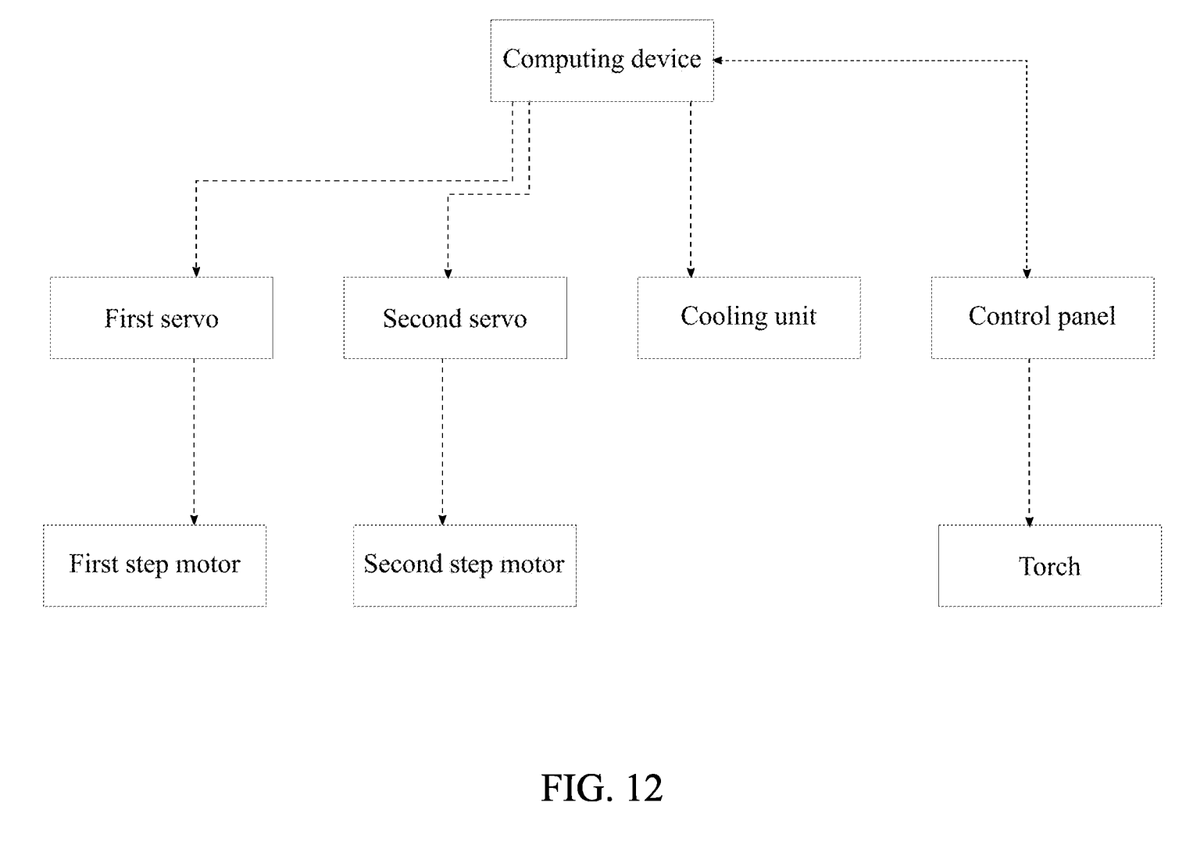
FIG. 12 is a basic illustration showing the electronical connections of the present invention.

In reference to FIG. 12, the computing device 4 is externally positioned to the enclosure 2 and electronically connected to the first servo drive 6, the second servo drive 7, the cooling unit 8, and the control panel 3 so that the input commands of the present invention can be executed. More specifically, the first servo drive 6 is electronically connected to the first step motor 13 so that the computing device 4 is able to execute the input commands of the control panel 3 with the first step motor 13 through the first servo drive 6. Similarly, the second servo drive 7 is electronically connected to the second step motor 16 so that the computing device 4 is able to execute the input commands of the control panel 3 with the second step motor 16 through the second servo drive 7. The torch 29 is also electronically connected to the control panel 3 so that the present invention can determine when to turn on and turn off the torch 29 according to the input commands of the control panel 3.

Figure 10:
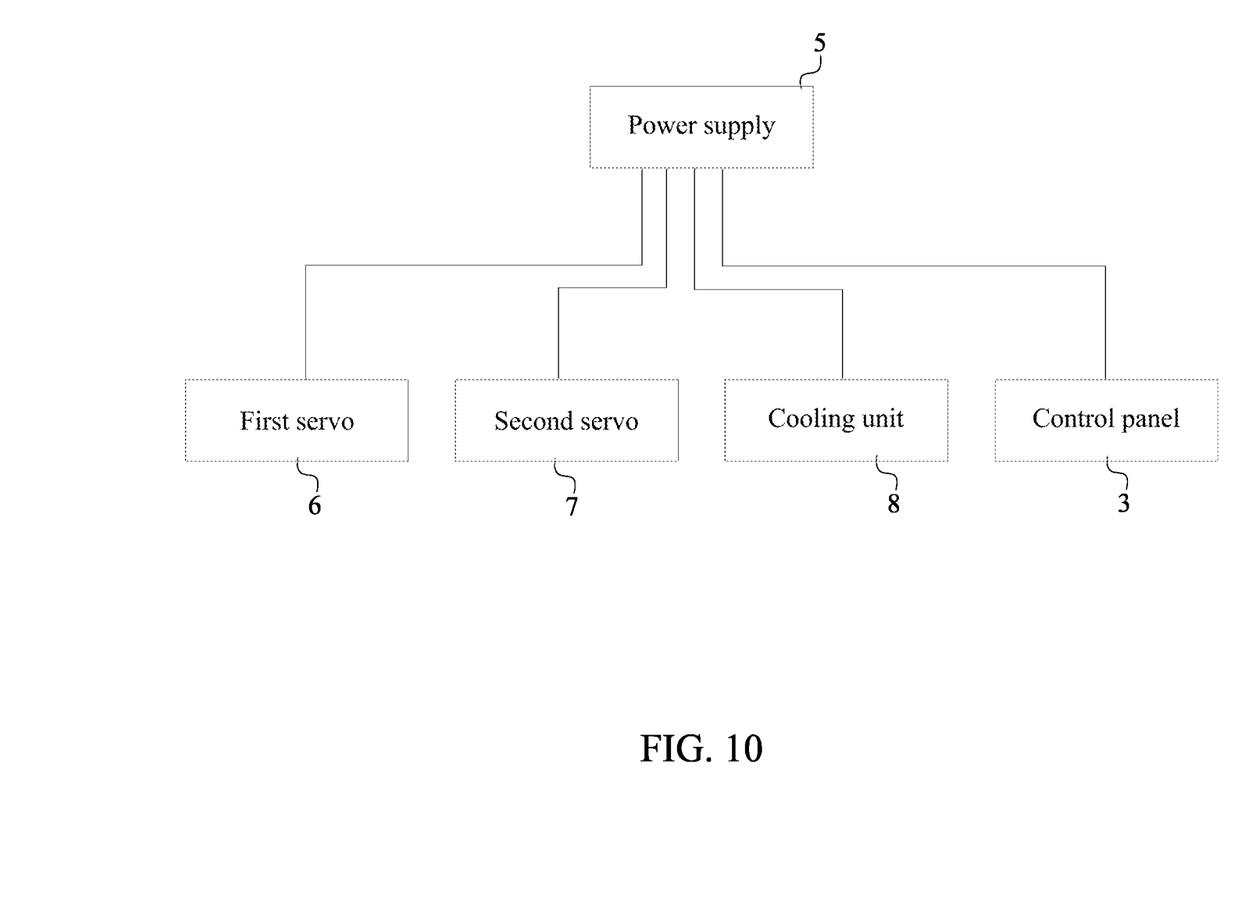
FIG. 10 is a basic illustration showing the electrical connection between the power supply, the first servo, the second servo, the cooling unit, and the control panel.

In reference to FIG. 10, the power supply unit 5 is electrically connected to the first servo drive 6, the second servo drive 7, the cooling unit 8, and the control panel 3. The power supply unit 5 is powered though an external electrical outlet and converts an alternating current (AC) from the external electrical outlet to a direct current (DC) so that the first servo drive 6, the second servo drive 7, the cooling unit 8, and the control panel 3 can be powered within the present invention.

The control arm 9 provides the linear movement and rotary movement within the present invention so that the torch 29 can be oriented according the desired cutting profile. In reference to FIG. 3-4, the control arm 9 comprises an elongated sleeve 10, a sleeve mount 11, and a torch mount 12. The elongated sleeve 10 is rotatably and terminally mounted to the sleeve mount 11 about the rotational axis 35. The sleeve mount 11 is slidably mounted within the enclosure 2 along the rotational axis 35. More specifically, the sleeve mount 11 is slidably mounted within the enclosure 2 thus allowing the elongated sleeve 10 to slide in and out of the enclosure 2 along the rotational axis 35. The elongated sleeve 10 is rotatably mounted to the sleeve mount 11 thus allowing the elongated sleeve 10 to rotate around the rotational axis 35. As a result, the present invention is able to simultaneously or individually apply the linear movement and the rotary movement within the present invention. The torch mount 12 is terminally connected to the elongated sleeve 10, wherein the torch mount 12 and the sleeve mount 11 are oppositely positioned of each other along the elongated sleeve 10. The torch mount 12 functions as a securing bracket for the torch 29 so that the torch 29 can be mounted to the elongated sleeve 10 through the torch mount 12.

Figure 4:
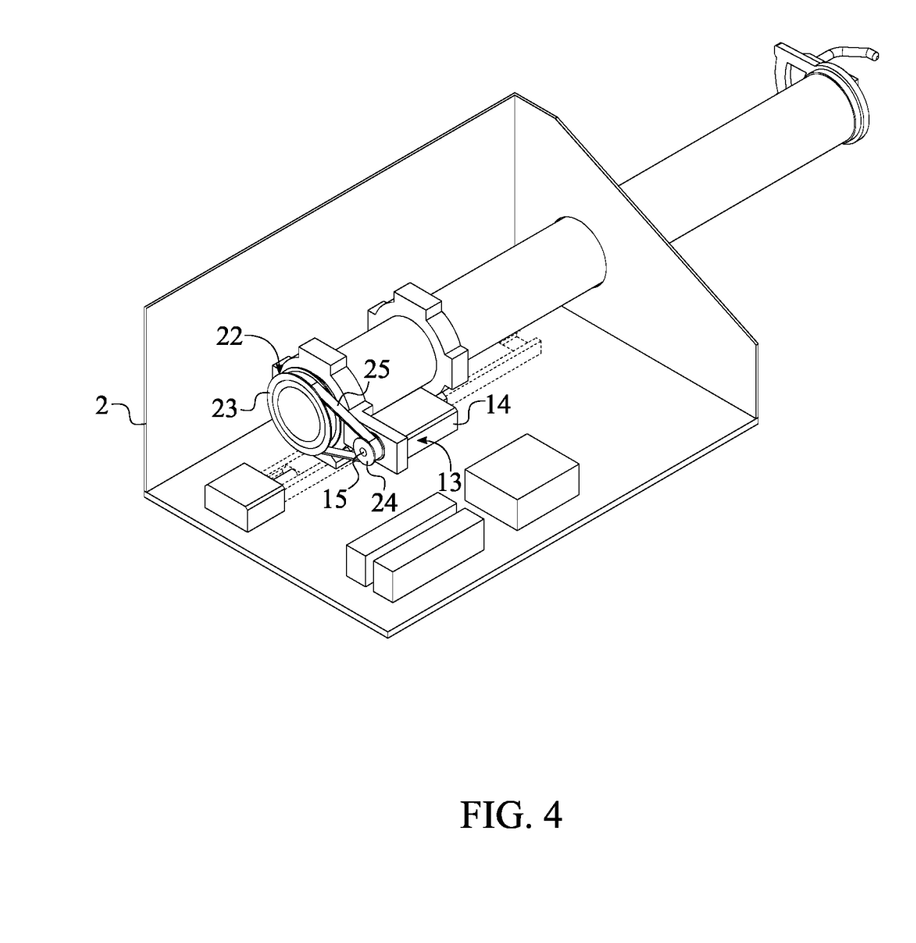
FIG. 4 is a perspective view of the control arm, the first step motor, the rotary drive mechanism of the present invention, wherein the dash lines illustrates the linear drive mechanism.

In reference to FIG. 4, the first step motor 13 is a DC electric motor that divides a full rotation into a number of equal steps for precise operation. Furthermore, the first step motor 13 is automatically calibrated in respect the torque and speed that required by the workpiece in order to rotationally drive the control arm 9.

Figure 3:
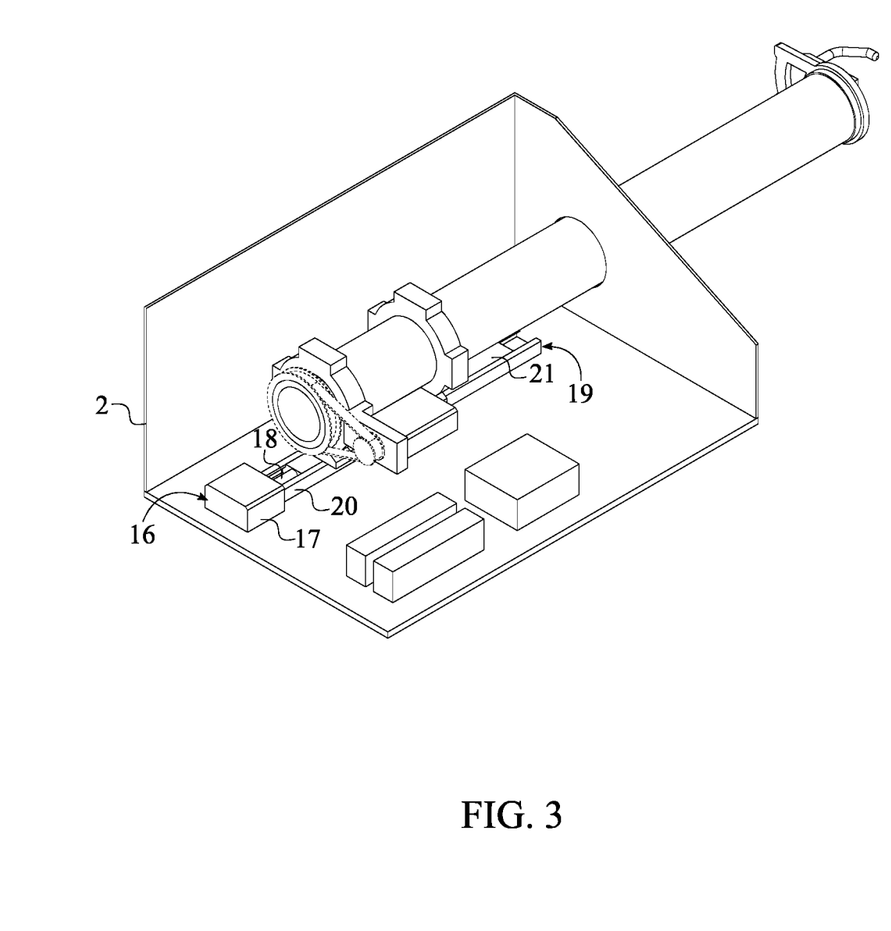
FIG. 3 is a perspective view of the control arm, the second step motor, the linear drive mechanism of the present invention, wherein the dash lines illustrates the rotary drive mechanism.

In reference to FIG. 3, the second step motor 16 is a DC electric motor that divides a full rotation into a number of equal steps for precise operation. Furthermore, the second step motor 16 is automatically calibrated in respect the torque and speed that required by the workpiece in order to linearly drive the control arm 9.

Figure 8:
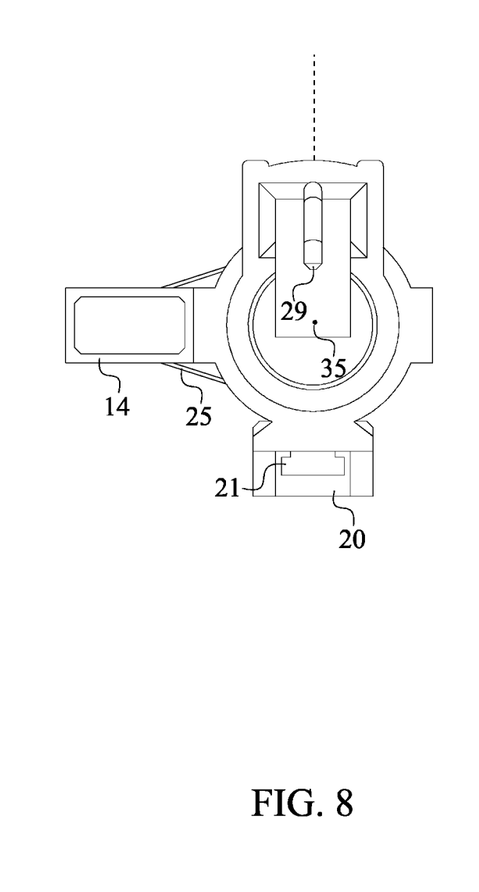
FIG. 8 is a side view of the control arm, showing a first positioned of the control arm around the rotational axis.
Figure 9:
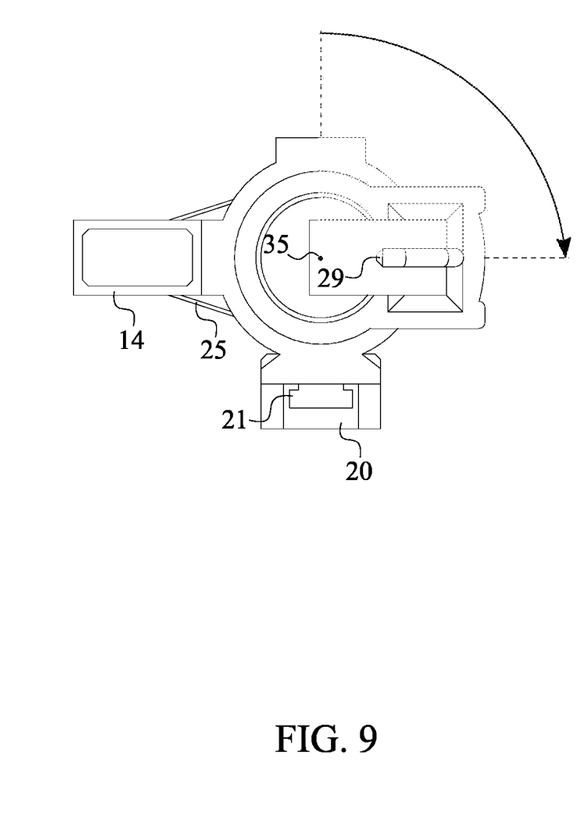
FIG. 9 is a side view of the control arm, showing a second positioned of the control arm around the rotational axis, wherein the second position illustrates the arc length travel by the control arm.

The rotary drive mechanism 22 transfers the output the first step motor 13 to the elongated sleeve 10 so that the control arm 9 can be rotate around the rotational axis 35. In reference to FIG. 4 and FIG. 8-9, the rotary drive mechanism 22 comprises a first pully 23, a second pully 24, and a belt 25. More specifically, the first pully 23 is concentrically mounted around the elongated sleeve 10 of the control arm 9 and functions as the driven pully within the preferred embodiment of the rotary drive mechanism 22. The second pully 24 is concentrically mounted around a rotor 15 of the first step motor 13 and functions as the drive pully within the preferred embodiment of the rotary drive mechanism 22, wherein a stator 14 of the first step motor 13 is mounted to the sleeve mount 11. The belt 25 is looped around the first pully 23 and the second pully 24 so that the output of the first step motor 13 respectively transfers into the control arm 9 through the second pully 24, the belt 25, and the first pully 23. In order to maximize the efficiency of the rotary drive mechanism 22, a diameter of the second pully 24 is designated to be greater than a diameter of the first pully 23 within the preferred embodiment of the rotary drive mechanism 22. Even though the preferred embodiment of the rotary drive mechanism 22 utilizes the first pully 23, the second pully 24, and the belt 25, any other types of rotary drive mechanism 22 that can rotate the control arm 9 can be utilized within the present invention.

Figure 6:
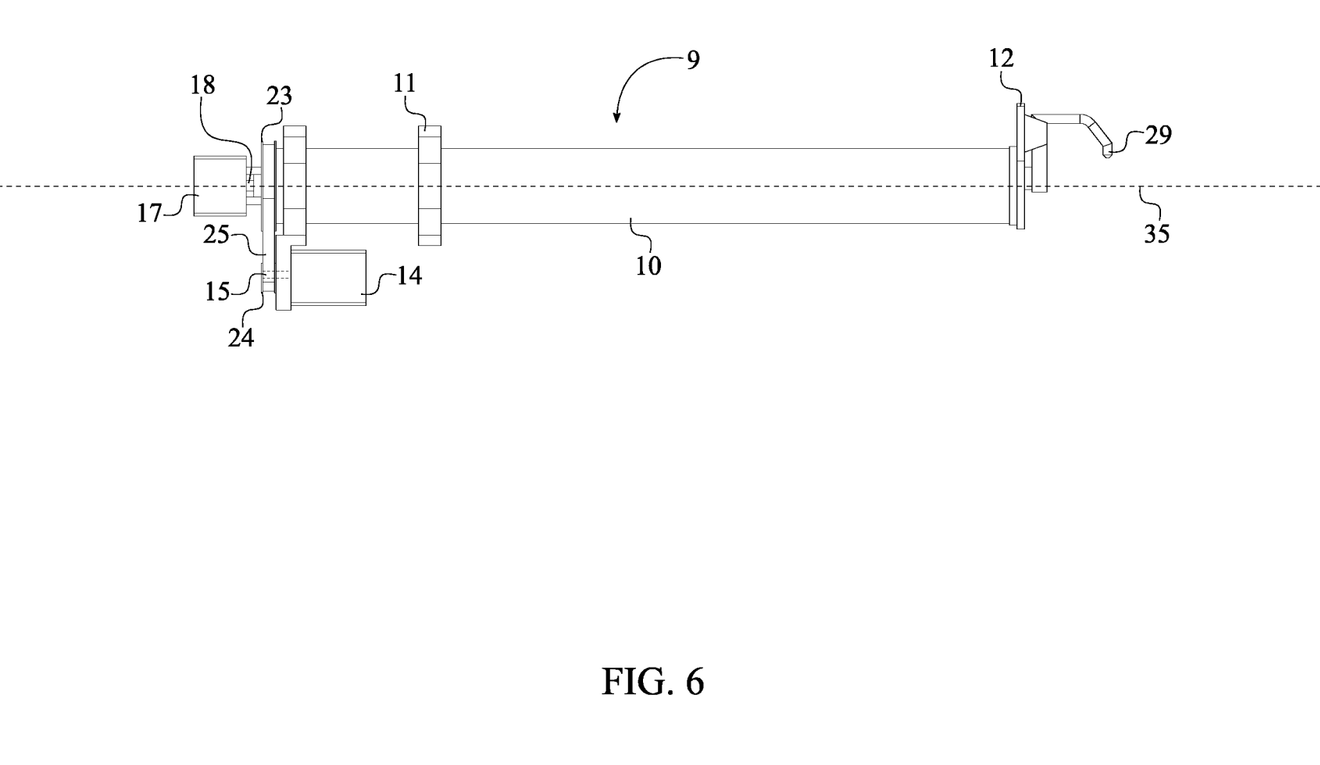
FIG. 6 is a top view of the control arm, showing a first positioned of the control arm along the rotational axis.
Figure 7:
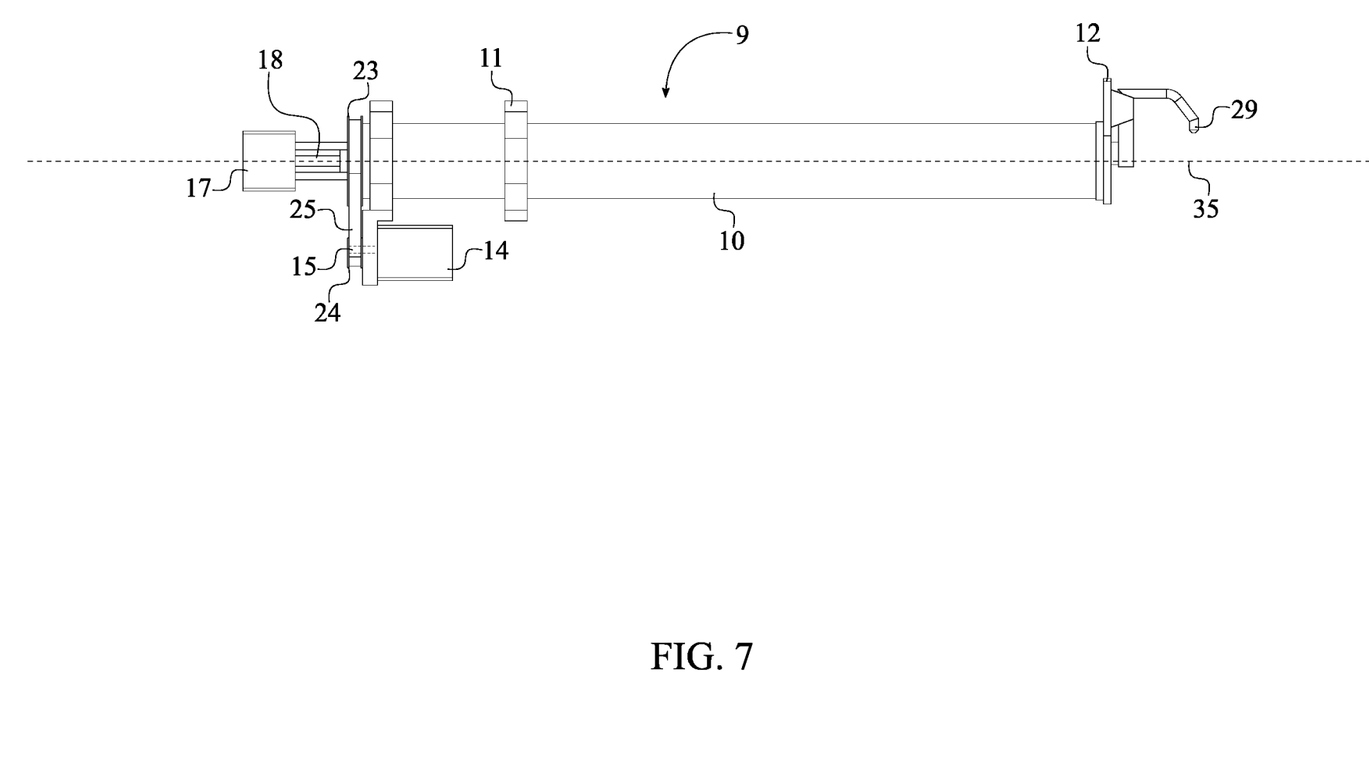
FIG. 7 is a top view of the control arm, showing a second positioned of the control arm along the rotational axis, wherein the second position illustrates the linear distance travel by the control arm.

The linear drive mechanism 19 transfers the output the second step motor 16 to the sleeve mount 11 so that the control arm 9 as an assembly can be linearly slide along the rotational axis 35. In reference to FIG. 3 and FIG. 6-7, the linear drive mechanism 19 comprises a first track 20 and a second track 21, wherein the first track 20 and the second track 21 are slidably engaged with each other. More specifically, the first track 20 is mounted to the enclosure 2 and functions as the stationary body within the preferred embodiment of the linear drive mechanism 19. The second track 21 is mounted to the sleeve mount 11 and functions as the sliding body within the preferred embodiment of the linear drive mechanism 19. A stator 17 of the second step motor 16 is mounted to the enclosure 2, and a rotor 18 of the second step motor 16 is coupled with the second track 21. Resultantly, the output of the second step motor 16 is transferred to the second track 21 in which moves the control arm 9 in and out of the enclosure 2. Even though the preferred embodiment of the linear drive mechanism 19 utilizes the first track 20 and the second track 21, any other types of linear drive mechanism 19 that can linearly move the control arm 9 can be utilized within the present invention.

Figure 5:
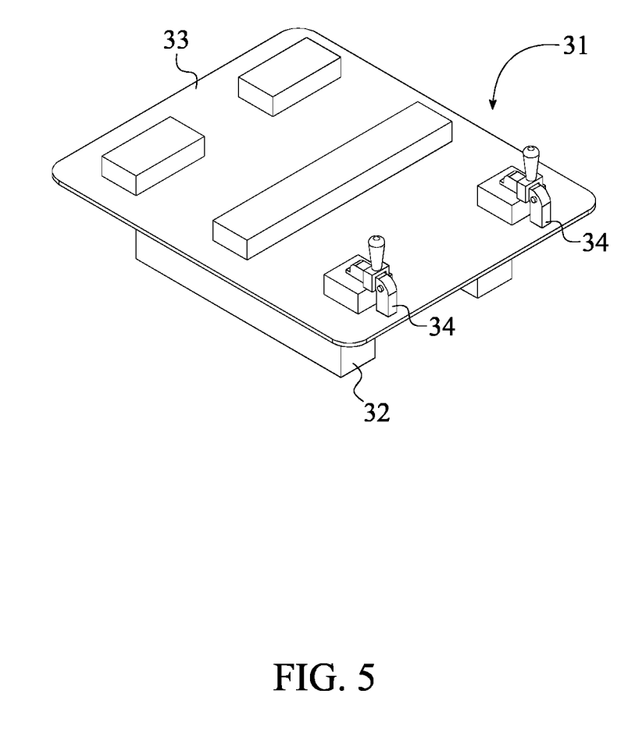
FIG. 5 is a perspective view of the tube placement deck of the present invention.

The tube placement deck 31 provides the necessary surface area for the workpiece to be secured within the present invention. In reference to FIG. 5, the tube placement deck 31 comprises a base 32, a removable deck plate 33, and at least one locking clamp 34. The base 32 is adjacently connected onto the platform 36 and positioned away from the control unit 1 so that the elongated sleeve 10 has sufficient space to move in and out of the enclosure 2 without any interference from the base 32. The removable deck plate 33 is attached onto the base 32 as the at least one locking clamp 34 is adjacently connected onto the removable deck plate 33. Additionally, the removable deck plate 33 comprises at least one placement body that allows the workpiece to be positioned according to a pre-bent angle. As a result, the workpiece can be first positioned about the at least one placement body, and the workpiece can be then secured to the removable deck plate 33 by the at least one locking clamp 34. Since the present invention is compatible with many different pre-bent angles, the removable deck plate 33 can be interchanged according to the pre-bent angles or the type of cutting that can be compound or straight.

Figure 11:
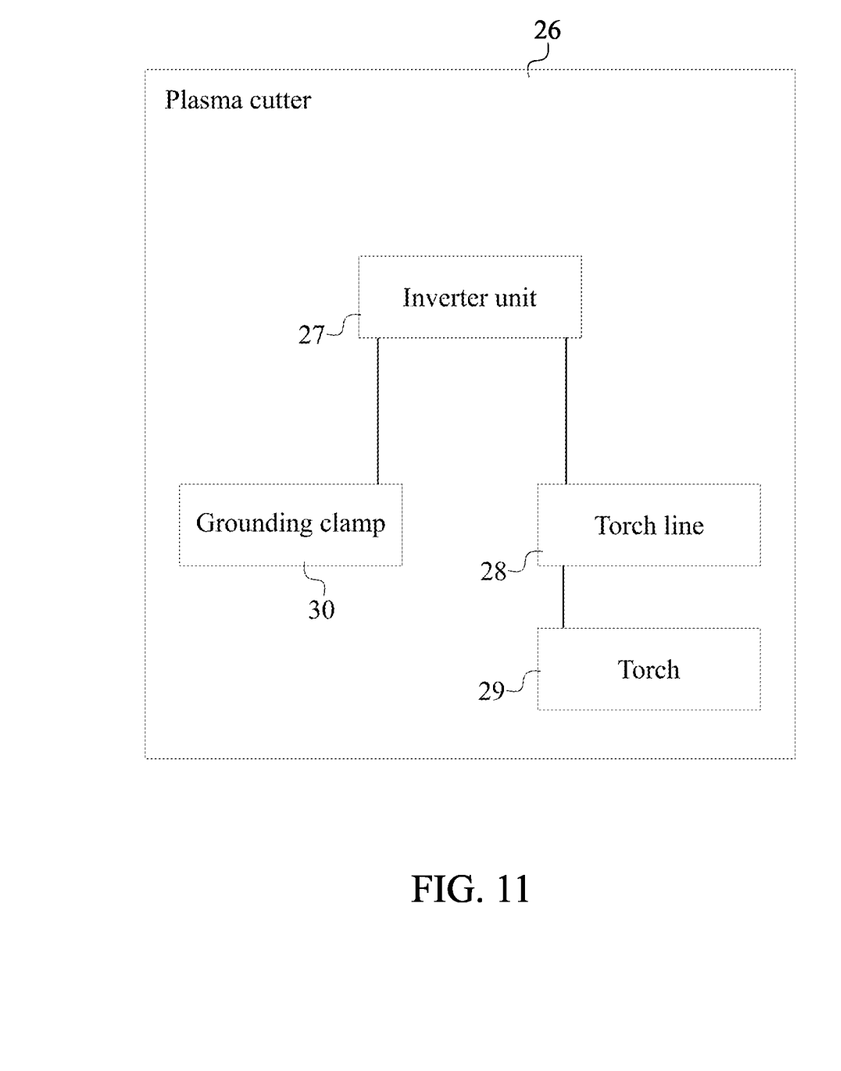
FIG. 11 is a basic illustration showing the electrical connection between the inverter unit, the grounding clamp, and the torch within the plasma cutter.

The plasma cutter 26 generally depends upon the thickness of the workpiece and the type of material for the workpiece. In reference to FIG. 11, the plasma cutter 26 comprises an inverter unit 27, a torch line 28, and a grounding clamp 30. The torch 29 is mounted to the torch mount 12 and oriented towards the rotational axis 35. The torch line 28 is positioned within the elongated sleeve 10 so that the rotational movement of the elongated sleeve 10 does not tangle the torch line 28 around the elongated sleeve 10. The torch 29 is electrically connected the inverter unit 27 by the torch line 28 so that the inverter unit 27 and the control panel 3 are collectively able to power the torch 29 according to the input commands. For example, the inverter unit 27 continuously powers the torch 29 during operation. However, the control panel 3 determine when to turn on or turn off the torch 29 according to the input commands. The grounding clamp 30 is electrically connected to the inverter unit 27 that is placed within the platform 36. The grounding clamp 30 promotes electrically safety within the present invention as electricity is properly grounded within the plasma cutting area. The plasma cutter 26 is not limited to aforementioned components and may comprise other required components that are essential to the basic functionality and known to industry standard.

A plurality of caster can be optionally mounted to the platform 36, opposite of the control unit 1 and the tube placement deck 31. As a result, the plurality of caster allows the platform 36 to be easily transported to in between different places thus providing a means of transportation to the present invention.

Although the invention has been explained in relation to its preferred embodiment, it is to be understood that many other possible modifications and variations can be made without departing from the spirit and scope of the invention as hereinafter claimed.

What is claimed is:

1. A portable plasma tube cutting apparatus for coping and cutting comprises:
    a control unit;
    a control arm;
    a first step motor;
    a second step motor;
    a linear drive mechanism;
    a rotary drive mechanism;
    a plasma cutter;
    a tube placement deck;
    a platform;
    an enclosure of the control unit being adjacently mounted onto the platform;
    the first step motor, the second step motor, the linear drive mechanism, and the rotary drive mechanism being mounted within the enclosure;
    the control arm being operatively coupled with the first step motor by the rotary drive mechanism, wherein the first step motor is used to rotationally drive the control arm about a rotational axis;
    the control arm being operatively coupled with the second step motor by the linear drive mechanism, wherein the second step motor is used to linearly drive the control arm along the rotational axis;
    the tube placement deck being adjacently mounted onto the platform; and
    a torch of the plasma cutter being terminally mounted to the control arm, in between the enclosure and the tube placement deck.

2. The portable plasma tube cutting apparatus for coping and cutting as claimed in claim 1 comprises:
    the control unit further comprises a control panel, a computing device, a power supply unit, a first servo drive, a second servo drive, and a cooling unit;
    the control panel being laterally connected to the enclosure;
    the power supply unit, the first servo drive, and the second servo drive being mounted within the enclosure;
    the cooling unit being laterally mounted to the enclosure;
    the computing device being externally positioned to the enclosure;
    the computing device being electronically connected to the first servo drive, the second servo drive, the cooling unit, and the control panel;
    the first servo drive being electronically connected to the first step motor;
    the second servo drive being electronically connected to the second step motor;
    the torch being electronically connected to the control panel; and
    the power supply unit being electrically connected to the first servo drive, the second servo drive, the cooling unit, and the control panel.

3. The portable plasma tube cutting apparatus for coping and cutting as claimed in claim 1 comprises:
    the control arm comprises an elongated sleeve, a sleeve mount, and a torch mount;
    the elongated sleeve being rotatably and terminally mounted to the sleeve mount about the rotational axis;
    the sleeve mount being slidably mounted within the enclosure along the rotational axis;
    the torch mount being terminally connected to the elongated sleeve; and
    the torch mount and the sleeve mount being oppositely positioned of each other along the elongated sleeve.

4. The portable plasma tube cutting apparatus for coping and cutting compound angles as claimed in claim 1 comprises:
- the rotary drive mechanism comprises a first pully, a second pully, and a belt;
- the first pully being concentrically mounted around an elongated sleeve of the control arm;
- the second pully being concentrically mounted around a rotor of the first step motor;
- a stator of the first step motor being mounted to a sleeve mount of the control arm; and
- the belt being looped around the first pully and the second pully.

5. The portable plasma tube cutting apparatus for coping and cutting as claimed in claim 1 comprises:
- the linear drive mechanism comprises a first track and a second track;
- the first track and the second track being slidably engaged with each other;
- the first track being mounted to the enclosure;
- the second track being mounted to a sleeve mount of the control arm;
- a stator of the second step motor being mounted to the enclosure; and
- a rotor of the second step motor being coupled with the second track.

6. The portable plasma tube cutting apparatus for coping and cutting as claimed in claim 1 comprises:
- the tube placement deck comprises a base, a removable deck plate, and at least one locking clamp;
- the base being adjacently connected onto the platform;
- the removable deck plate being attached onto the base; and
- the at least one locking clamp being adjacently connected onto the removable deck plate.

7. The portable plasma tube cutting apparatus for coping and cutting as claimed in claim 1 comprises:
- the plasma cutter comprises an inverter unit, a torch line, and a grounding clamp;
- the torch being mounted to a torch mount of the control arm;
- the torch line being positioned within an elongated sleeve of the control arm;
- the torch being electrically connected the inverter unit by the torch line; and
- the grounding clamp being electrically connected to the inverter unit.

* * * * *